(12) United States Patent
Wert et al.

(10) Patent No.: US 9,663,938 B2
(45) Date of Patent: May 30, 2017

(54) HANGER FOR BRACING PANEL

(71) Applicant: Columbia Insurance Company, Omaha, NE (US)

(72) Inventors: David C. Wert, Pacific, MO (US); Gary Gannon, Creve Coeur, MO (US); Philip O'Regan, St. Louis, MO (US); Levi Sorrill, St. Charles, MO (US); John Galinski, Troy, IL (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 14/832,176

(22) Filed: Aug. 21, 2015

(65) Prior Publication Data

US 2017/0051499 A1 Feb. 23, 2017

(51) Int. Cl.
| | | |
|---|---|---|
| *E04B 1/41* | (2006.01) | |
| *F16M 13/02* | (2006.01) | |
| *E04B 7/02* | (2006.01) | |
| *E04B 1/38* | (2006.01) | |

(52) U.S. Cl.
CPC ............... *E04B 1/40* (2013.01); *E04B 7/022* (2013.01); *F16M 13/02* (2013.01); *E04B 2001/405* (2013.01)

(58) Field of Classification Search
CPC ...... E04B 1/40; E04B 7/022; E04B 2001/405; F16M 13/02
USPC ........ 52/702, 289, 283, 301, 712; 403/232.1
See application file for complete search history.

(56) References Cited

U.S. PATENT DOCUMENTS

| | | | | | |
|---|---|---|---|---|---|
| 770,050 | A | * | 9/1904 | Dreyer ................. | F16B 7/0446 248/300 |
| 3,481,635 | A | * | 12/1969 | Tracy .................... | E04B 1/2608 403/191 |
| 3,651,612 | A | * | 3/1972 | Schmitt ..................... | E04C 3/16 52/642 |
| 3,867,803 | A | * | 2/1975 | Platt .......................... | E04C 3/18 52/693 |
| 4,005,556 | A | * | 2/1977 | Tuomi ...................... | E04B 1/26 52/299 |

(Continued)

FOREIGN PATENT DOCUMENTS

EP    1 167 779 A2    1/2002

OTHER PUBLICATIONS

Invitation to Pay Additional Fees and, Where applicable, Protest Fee for Application No. PCT/IB2016/055008, Nov. 4, 2016, 6 pages.

(Continued)

*Primary Examiner* — Babajide Demuren
(74) *Attorney, Agent, or Firm* — Senniger Powers LLP

(57) ABSTRACT

A hanger for connecting a bracing panel to a truss having a chord member includes a first portion having opposite upper and lower edge margins. The first portion is configured to be positioned between the chord member and the bracing panel. A second portion extends from the upper edge margin of the first portion in a first direction. The second portion is configured to overlie and engage a portion of the chord member. A third portion extends from the lower edge margin of the first portion in a second direction opposite the first direction. The third portion is configured to underlie and support a portion of the bracing panel.

4 Claims, 7 Drawing Sheets

(56) References Cited

U.S. PATENT DOCUMENTS

| | | | | |
|---|---|---|---|---|
| 4,160,350 | A * | 7/1979 | Craib | E04C 3/292 411/458 |
| 4,207,719 | A * | 6/1980 | Knowles | E04C 3/292 52/693 |
| 4,274,241 | A * | 6/1981 | Lindal | E04B 1/26 411/461 |
| 4,555,887 | A * | 12/1985 | Rionda | E04B 1/2612 403/232.1 |
| 4,561,230 | A * | 12/1985 | Rionda | E04B 1/2612 403/232.1 |
| D286,855 | S * | 11/1986 | Paul | D8/389 |
| 4,641,480 | A * | 2/1987 | Mort | E04C 3/16 403/230 |
| 5,094,059 | A * | 3/1992 | Ganescu | E04B 1/3441 16/371 |
| 5,104,252 | A * | 4/1992 | Colonias | E04B 1/2612 403/230 |
| 5,301,486 | A * | 4/1994 | Taylor | E04B 5/12 52/638 |
| 5,561,949 | A * | 10/1996 | Knoth | E04B 1/2608 403/232.1 |
| 5,946,879 | A * | 9/1999 | Pellock | E04C 3/17 403/232.1 |
| 6,085,482 | A * | 7/2000 | Jalla | E04C 3/17 403/232.1 |
| 6,148,579 | A * | 11/2000 | Rolf | E04C 3/16 403/232.1 |
| 6,176,060 | B1 * | 1/2001 | Kennelly | E04C 3/17 52/633 |
| 6,308,469 | B1 * | 10/2001 | Leung | E04B 1/10 411/466 |
| 6,711,867 | B1 * | 3/2004 | Smith | E04B 1/82 52/481.1 |
| 6,763,634 | B1 * | 7/2004 | Thompson | E04B 7/045 52/167.1 |
| 6,877,291 | B2 * | 4/2005 | Shamroukh | E04B 7/022 403/232.1 |
| 6,883,880 | B2 * | 4/2005 | Flores | A47B 96/18 108/157.18 |
| 7,200,972 | B1 * | 4/2007 | Freeman | E04C 3/005 52/641 |
| 9,080,325 | B1 * | 7/2015 | Hensen | F16B 15/0046 |
| 2002/0069607 | A1 * | 6/2002 | Thompson | E04B 1/26 52/702 |
| 2005/0155307 | A1 * | 7/2005 | Timony | E04B 1/2612 52/506.01 |
| 2015/0075107 | A1 | 3/2015 | Wert et al. | |

OTHER PUBLICATIONS

International Search Report and Written Opinion for Application No. PCT/IB2016/055008, Jan. 2, 2017, 14 pages.

* cited by examiner

HANGER FOR BRACING PANEL

FIELD OF THE INVENTION

The present invention generally relates to connections for structures, and more specifically, a hanger for connecting a bracing panel to a truss.

BACKGROUND

The use of trusses in the building of structures is commonplace. When the trusses are installed, regulations require that they be braced for structural integrity during installation. Typically, the trusses are braced to the ground. Ground bracing can be a time-consuming process, and the ground braces must be removed when the structure is completed. Bracing the structure is inconvenient and time consuming. A bracing panel for use as an alternative to ground bracing is disclosed in U.S. Published Application No. 2015/0075107 (abandoned), the entirety of which is incorporated herein by reference.

SUMMARY

In one aspect, a hanger for connecting a bracing panel to a truss having a chord member includes a first portion having opposite upper and lower edge margins. The first portion is configured to be positioned between the chord member and the bracing panel. A second portion extends from the upper edge margin of the first portion in a first direction. The second portion is configured to overlie and engage a portion of the chord member. A third portion extends from the lower edge margin of the first portion in a second direction opposite the first direction. The third portion is configured to underlie and support a portion of the bracing panel.

In another aspect, a bracing panel for bracing adjacent roof trusses includes engagement members and at least one spacing member extending between and connecting the engagement members together in spaced apart relation. Hangers connect the spacing member to the engagement members. Each hanger includes a first portion projecting laterally outwardly from a respective one of the engagement members, a second portion adjacent to said one engagement member, and a third portion underlying said one engagement member and the spacing member. The third portion has nailing teeth embedded in said one engagement member and the spacing member.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
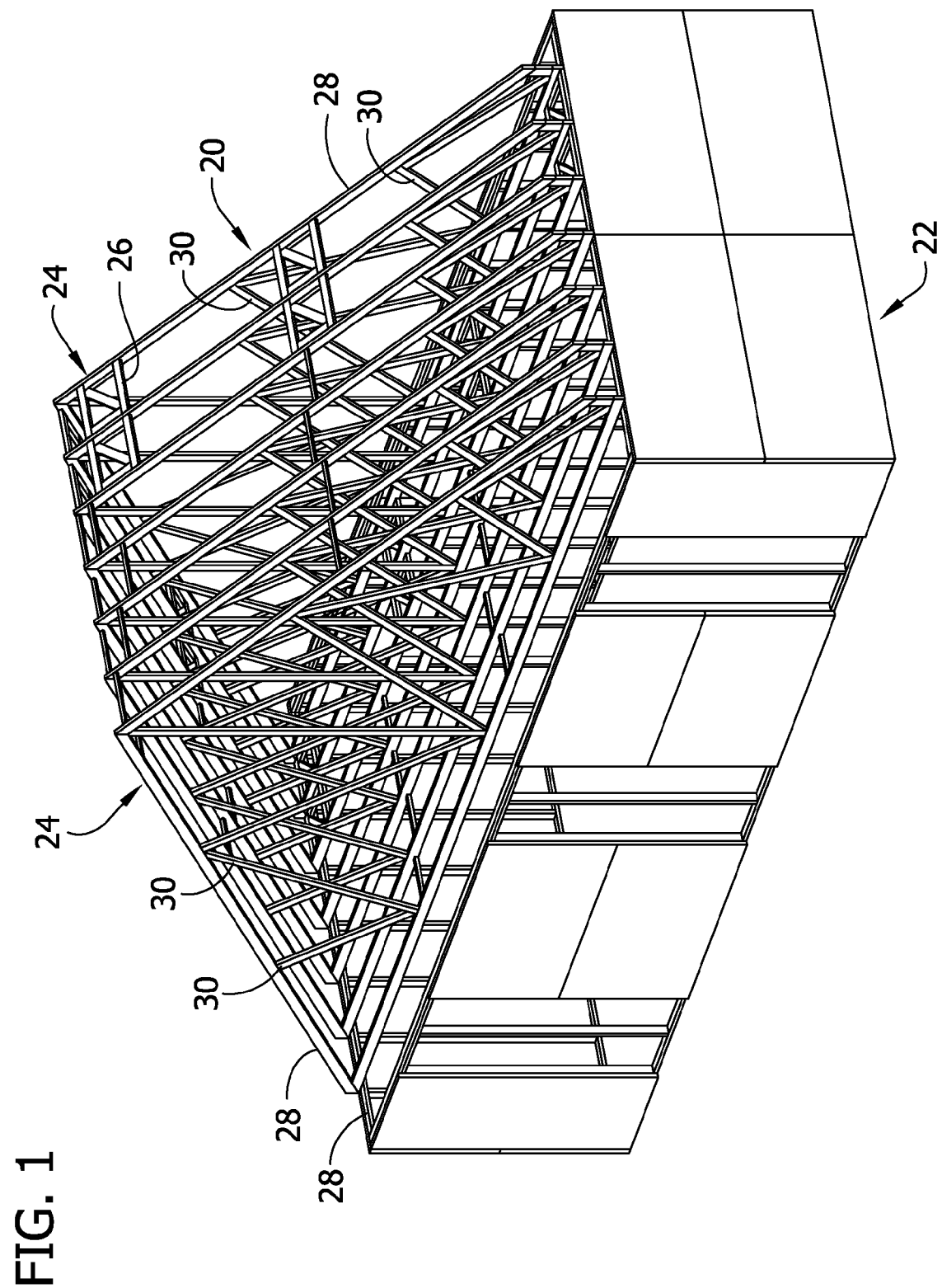
FIG. 1 is a perspective of a building structure including braced truss frames extending between adjacent trusses.
Figure 2:
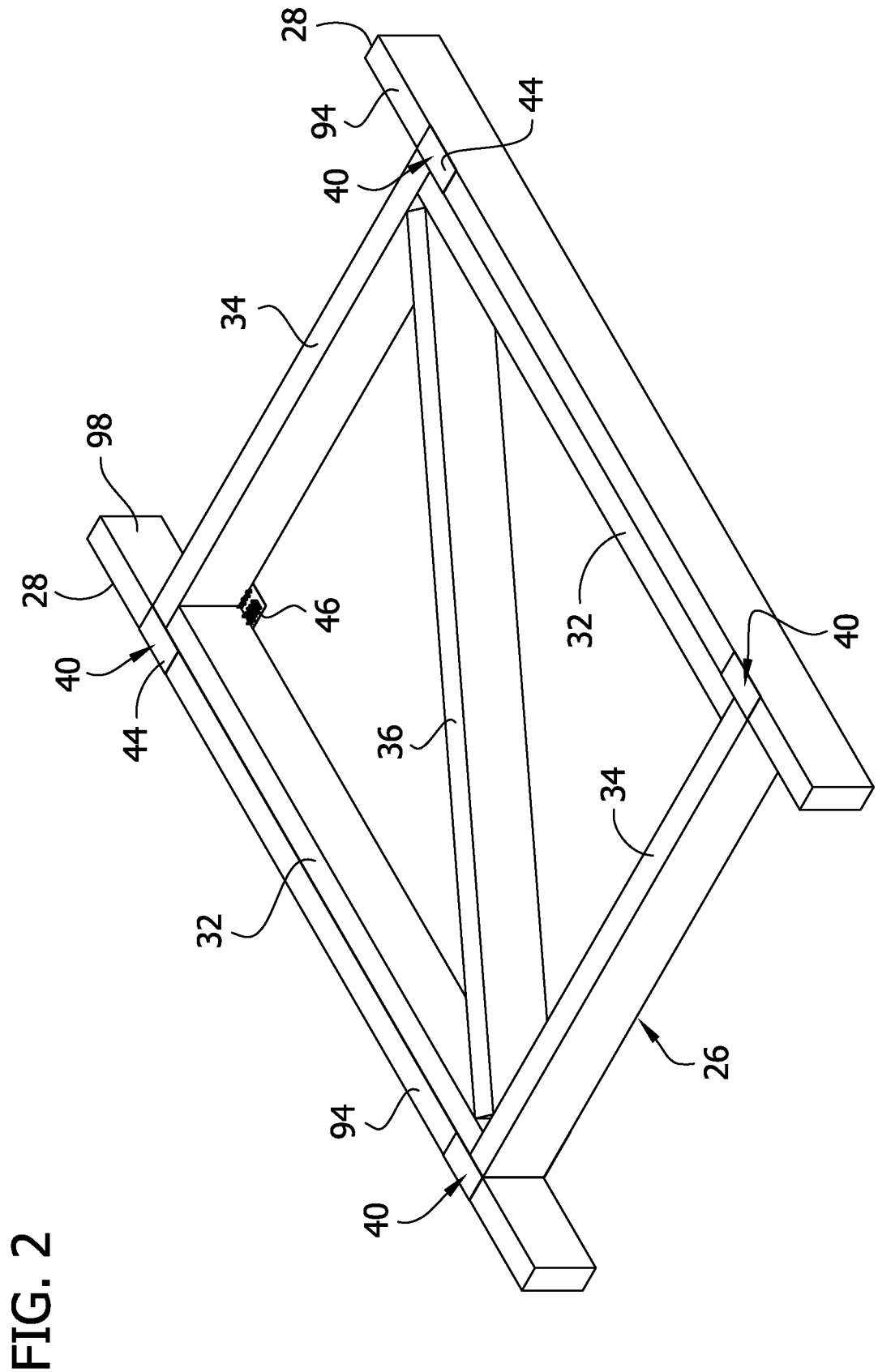
FIG. 2 is a fragmentary perspective of a bracing panel mounted on adjacent trusses by a hanger according to an embodiment of the present invention.
Figure 3:
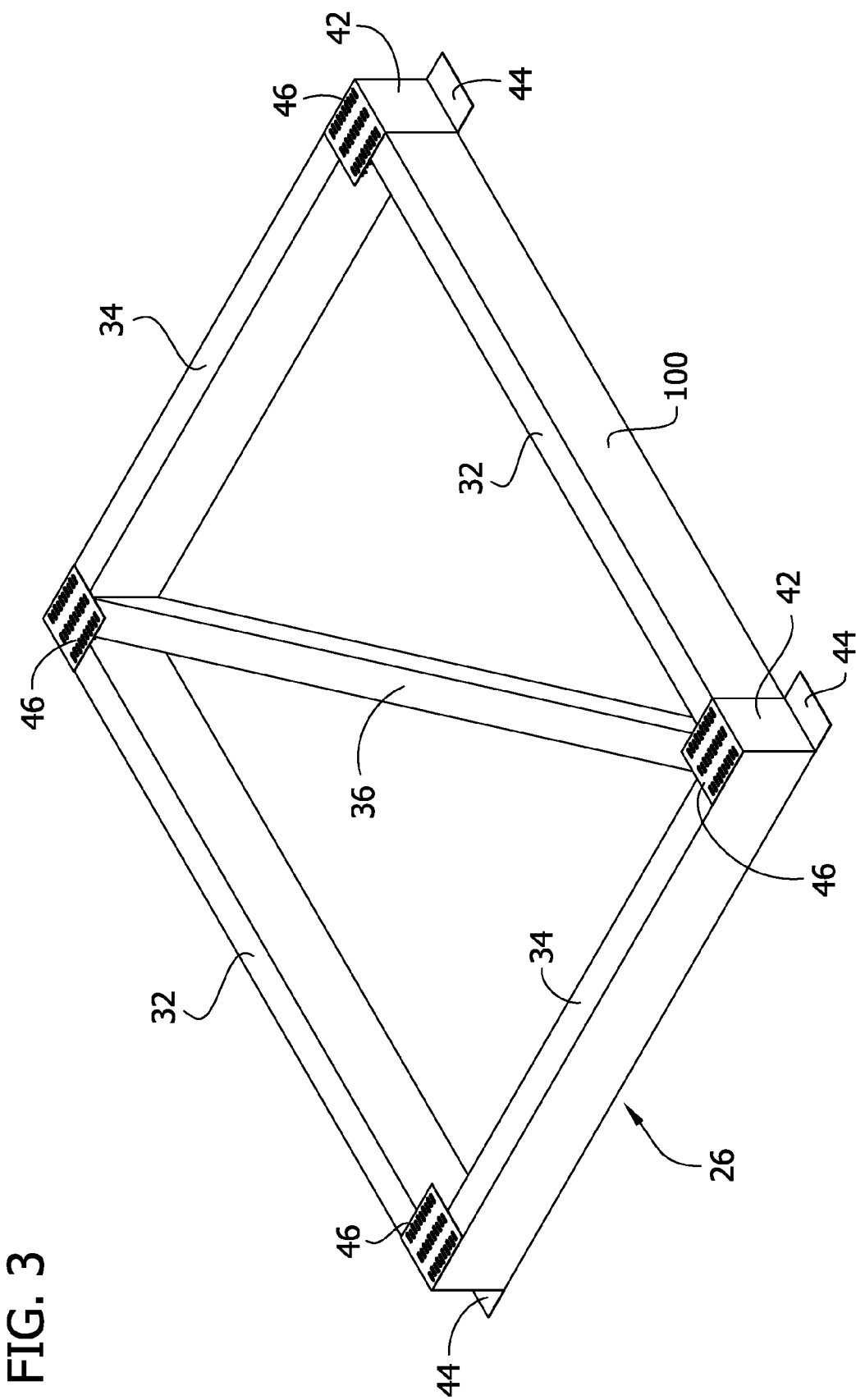
FIG. 3 is a partial bottom perspective of a bracing panel having the hanger attached thereto.

Referring to FIG. 1, a braced truss frame is generally indicated by reference number 20 and is shown installed on a wall structure, generally indicated at 22. The braced truss frame 20 includes trusses 24 and bracing panels 26 connecting the trusses and maintaining the trusses in spaced parallel alignment. Each of the trusses 24 is formed from truss members including chord members 28 and web members 30 extending between and interconnecting the chord members. The number and orientations of the truss members may vary from the illustrated embodiment without departing from the scope of the present invention. Each of the bracing panels 26 includes engagement members 32 configured to engage the chord members 28 of the trusses 24, spacing members 34 configured to space the engagement members, and may include a diagonal member 36 extending between the engagement members and laterally with respect to the spacing members (FIGS. 2 and 3). Other configurations of the bracing panels are within the scope of the present invention, such as a bracing panel with no diagonal member.

Figure 4:
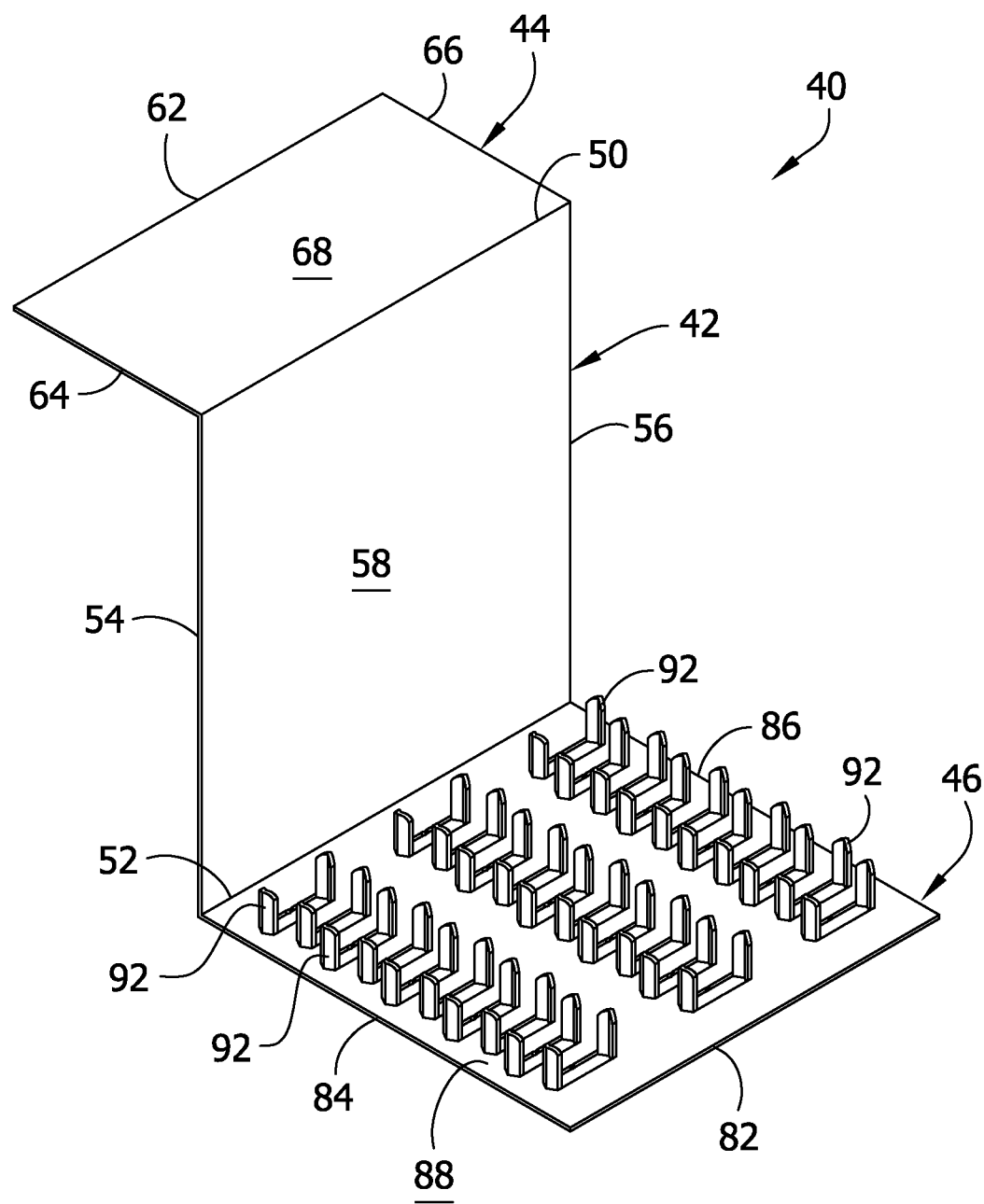
FIG. 4 is a perspective of the hanger.
Figure 5:
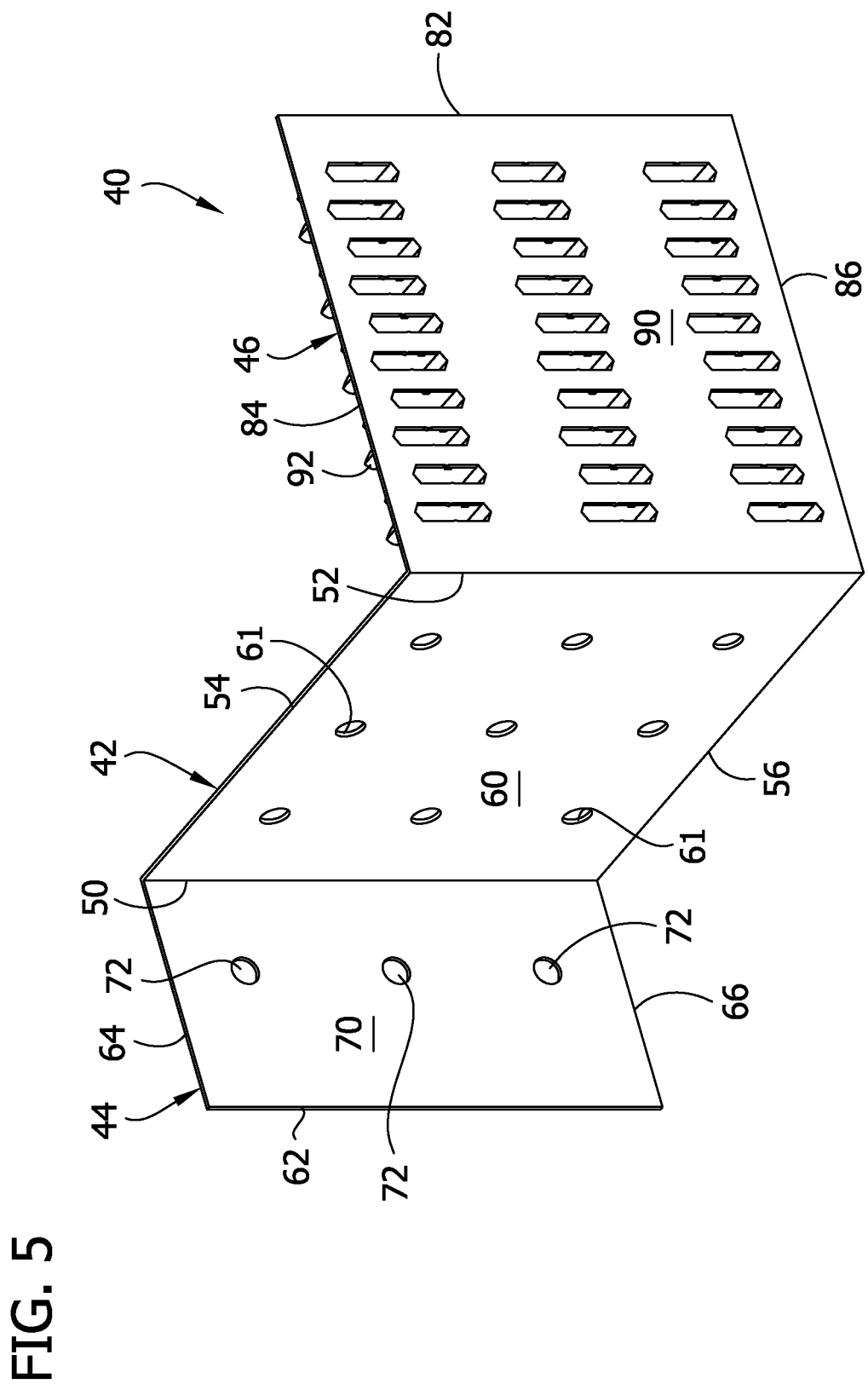
FIG. 5 is a perspective of the hanger, illustrating an embodiment of attachment structure on a portion of the hanger.
Figure 6:
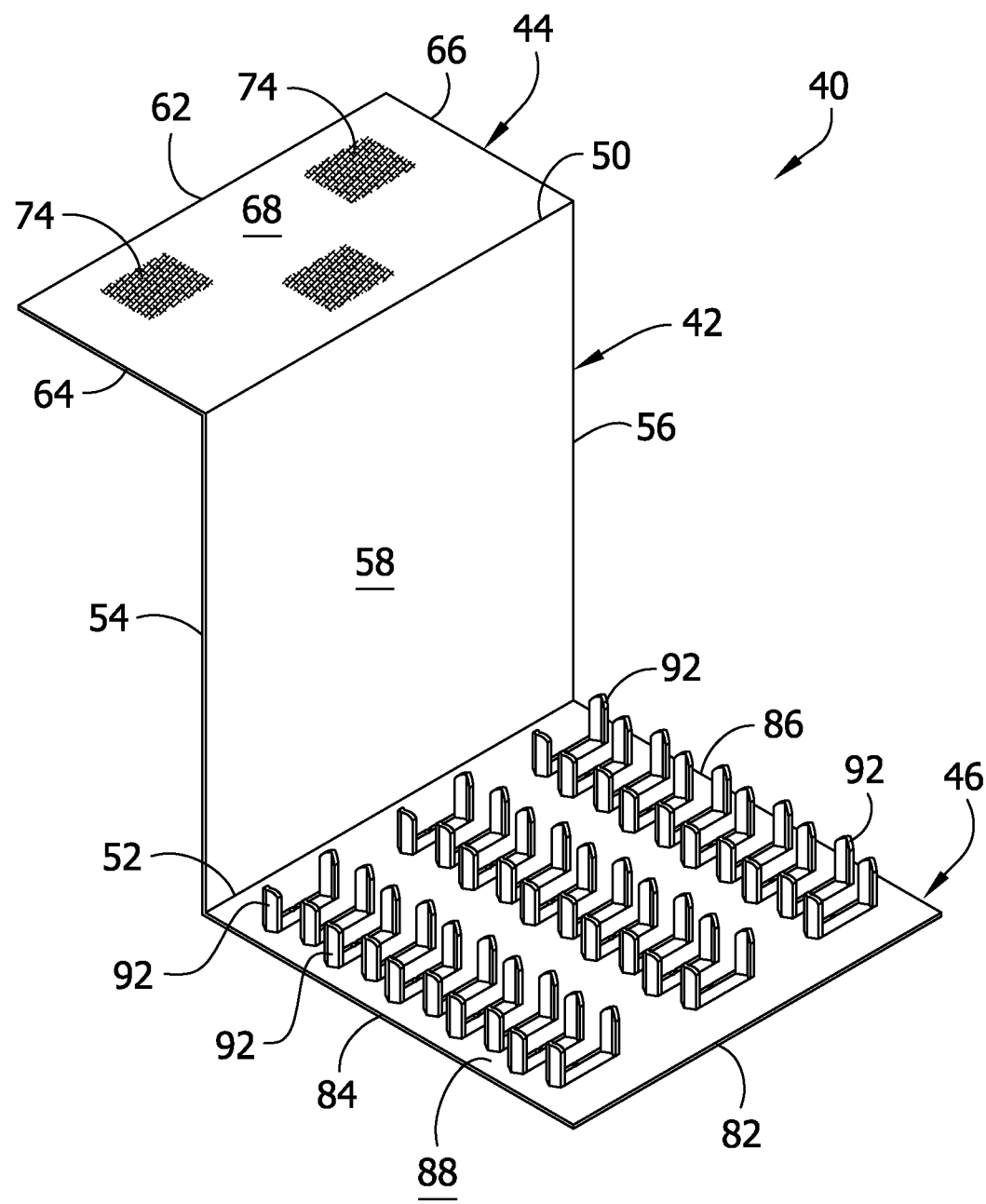
FIG. 6 is a perspective of the hanger, illustrating another embodiment of attachment structure on a portion of the hanger.

Referring to FIGS. 4-6, a hanger for attaching the bracing panel 26 to a truss 24 is generally indicated at 40. The hanger 40 includes a first portion 42, a second portion 44, and a third portion 46. The first, second, and third portions 42, 44, 46 are generally planar. In the illustrated embodiment, the hanger 40 is formed as a unitary one-piece structure. The hanger 40 can be formed from a sheet metal or other suitable material. The hanger 40 can be formed from a material having a thickness in a range of about 0.0356 inches (0.90424 mm) to about 0.0575 inches (1.4605 mm). For example, in one embodiment, the hanger 40 is formed from a material having a thickness of at least about 0.0356 inches (0.90424 mm). In one embodiment, the hanger 40 is formed from 20 gauge steel. Other configurations and materials are within the scope of the present invention. For example, in one embodiment the portions of the hanger can be formed separately and attached together. As set forth below, in general the hanger 40 is configured to attach the bracing panel 26 to the truss 24. The orientation of the hanger 40 in the drawings provides the point of reference for the terms defining relative locations and positions of structures and components of the hanger, including but not limited to the terms "upper," "lower," "left," "right," "top," "bottom," "front," and "rear," as used throughout the present disclosure.

Referring still to FIGS. 4-6, the first portion 42 is generally rectangular and has opposite upper and lower edge margins 50, 52, opposite left and right edge margins 54, 56, a front face 58, and a rear face 60 (FIG. 5). In one embodiment, the first portion 42 has a length extending between the upper and lower edge margins 50, 52 in a range of about 1.5625 inches (39.6875 mm) to about 5.5625 inches (141.2875 mm), for example about 3.5625 inches (90.4875 mm). In one embodiment the first portion 42 has a width extending between the left and right edge margins 54, 56 in a range of about 3.0 inches (76.2 mm) to about 6.0 inches (152.4 mm), for example about 3.0 inches (76.2 mm). The first portion 42 is configured to be positioned between the bracing panel 26 and the truss chord member 28 when the hanger 40 is in use. Optionally, the first portion 42 can include attachment structure. For example, the first portion 42 can include at least one opening 61 (FIG. 5) configured to receive a fastener (e.g., nail, screw, or other suitable fastener, not shown) to attach the first portion 42 to the bracing panel 26 and/or the truss 24. Other attachment structures are within the scope of the present invention. It is understood that the attachment structure on the first portion can be omitted within the scope of the present invention.

The second portion 44 extends from the first portion 42 at the upper edge margin 50. The second portion 44 is generally rectangular and extends from the upper edge margin 50 to a free end 62. The second portion 44 has opposite left and right edge margins 64, 66, a top face 68, and a bottom face 70 (FIG. 5). In one embodiment, the second portion 44 has a length extending between the upper margin 50 and the free end 62 in a range of about 0.625 inches (15.875 mm) to about 3.0 inches (76.2 mm), for example about 1.4375 inches (36.5125 mm). In one embodiment the second portion 44 has a width extending between the left and right edge margins 64, 66 in a range of about 3.0 inches (76.2 mm) to about 6.0 inches (152.4 mm), for example about 3.0 inches (76.2 mm). As seen in FIG. 4, the second portion 44 extends from the first portion 42 in a rearward direction (i.e., in the direction of the rear face 60 of the first portion). The second portion 44 is configured to engage the truss chord member 28 when the hanger 40 is in use. Fasteners (not shown) may be driven through the second portion 44 to connect the hanger 40 to the chord member 28. Optionally, the second portion 44 can include attachment structure. For example, the second portion 44 can include at least one opening 72 (FIG. 5) configured to receive a fastener (e.g., nail, screw, or other suitable fastener, not shown) to attach the second portion 44 to the truss 24. In one embodiment, the second portion 44 includes at least one nail grid 74 to facilitate use of a nail gun to attach the second portion to the truss 24 (FIG. 6). The nail grid 74 can include at least one of a roughened surface, a knurled surface, embossing, and surface etching. The nail grid 74 ensures a nail gun does not bounce off the hanger 40 during use, and also informs a user as to the preferred locations for nailing. Other attachment structures are within the scope of the present invention.

The third portion 46 extends from the first portion 42 at the lower edge margin 52. The third portion 46 is generally rectangular and extends from the lower edge margin 52 to a free end 82. The third portion 46 has opposite left and right edge margins 84, 86, a top face 88, and a bottom face 90 (FIG. 5). In one embodiment, the third portion 46 has a length extending between the lower margin 52 and the free end 82 in a range of about 3.0 inches (76.2 mm) to about 6.0 inches (152.4 mm). In one embodiment the third portion 46 has a width extending between the left and right edge margins 84, 86 in a range of about 3.0 inches (76.2 mm) to about 6.0 inches (152.4 mm). In one embodiment, the third portion 46 is generally square, for example having a length of about 3.0625 inches (77.7875 mm) and a width of about 3.0 inches (76.2 mm). As seen in FIG. 4, the third portion 46 extends from the first portion 42 in a forward direction (i.e., in the direction of the front face 58 of the first portion). Thus, the second portion 44 extends from the first portion 42 in a first direction and the third portion 46 extends from the first portion in a second direction opposite the first direction. The second portion 44 and the third portion 46 are substantially parallel. The first portion 42 is substantially perpendicular to both the second portion 44 and the third portion 46. The third portion 46 is configured to engage the bracing panel 26 when the hanger 40 is in use. The third portion 46 includes attachment structure configured to attach the hanger 40 to the bracing panel 26. As illustrated, the third portion 46 includes nailing teeth 92 struck from the third portion. The nailing teeth 92 extend upward from the third portion 46 (i.e., in the same direction as the first portion 42). Other attachment structure is within the scope of the present invention. For example, in one embodiment the third portion 46 can include openings configured to receive a fastener (e.g., nail or screw), any other suitable attachment structure, or no attachment structure.

In use, the hanger 40 is first used to assemble the bracing panel 26. The engagement members 32, spacing members 34 and diagonal member 36 (if present) can be placed in a jig (not shown) or the like in the arrangement relative to each other that will be the final configuration of the bracing panel. The bottom side of the bracing panel 26 preferably faces upwardly as the members are arranged in the jig. One hanger 40 can be placed at each of the four corners of the bracing panel 26 and on the bottom side. The hanger 40 is arranged so that the third portion 46 and more particularly the nailing teeth 92 of the third portion overlie the engagement member 32 and spacing member 34 at two of the corners, and overlie the engagement member, spacing member and diagonal member 36 (if present) at the other two corners. The nailing teeth 92 of the hangers 40 can be driven into the engagement member 32 and spacing member 34, and into the engagement member, spacing member and diagonal member 36 (if present) in a suitable manner. For example and without limitation, the hanger 40 may be driven into the members 32, 34, 36 using a roller or other press, or hammer. In this way, the hanger 40 unifies the engagement members 32, spacing members 34 and diagonal members 36 into a unitary bracing panel 26. In one embodiment, the bracing panels 26 can be formed at a manufacturing facility and transported to a worksite for installation, although it is contemplated that the bracing panels can be formed at the worksite with appropriate equipment.

Figure 7:
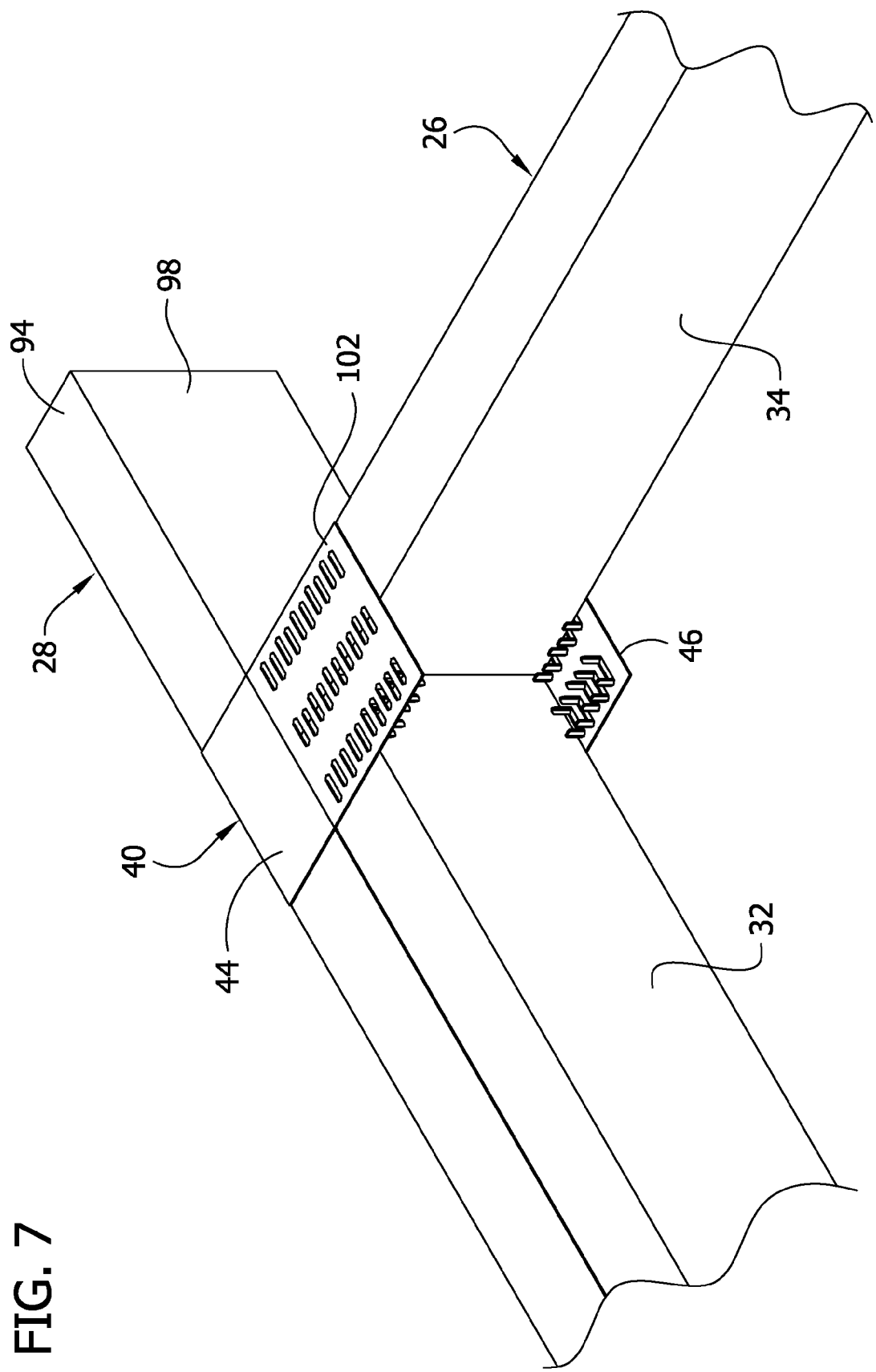
FIG. 7 is an enlarged fragmentary perspective of a joint of the bracing panel, illustrating the bracing panel attached to the truss with the hanger.

At the worksite, the bracing panels 26 are positioned between adjacent trusses 24 so that second portions 44 of the four hangers 40 forming part of the bracing panel overlie top faces 94 of chord members 28 of the trusses 24 (see, FIGS. 2 and 7). The second portion 44 is attached to the chord member 28, e.g., by driving fasteners through the material of the second portion (FIG. 4), by inserting fasteners through openings 72 (FIG. 5), by using a nail gun to insert nails through nail grid 74 (FIG. 6), or by any other suitable attachment. In this way the bracing panel 26 can be connected to adjacent trusses 24 for bracing the trusses. The first portion 42 of the hanger 40 is positioned between the truss 24 and the bracing panel 26. The rear face 60 of the first portion 42 engages an inner face 98 of the chord member 28. The front face 58 of the first portion 42 engages an outer face 100 of the bracing panel 26. As illustrated in FIG. 2, four hangers 40 can be used to attach the bracing panel 26 to chord members 28 of two parallel trusses 24 at each corner of the bracing panel.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A bracing panel for bracing adjacent roof trusses, the bracing panel comprising engagement members and at least one spacing member extending between and connecting the engagement members together in spaced apart relation, hangers connecting the spacing member to the engagement members, each hanger including a first portion adjacent to said one engagement member, a second portion projecting laterally outwardly from a respective one of the engagement members, the second portion having opposing left and right edge margins and extending from the upper edge margin of the first portion in a first direction to a free end, and a third portion having opposing left and right edge margins and extending from the lower edge margin of the first portion in a second direction opposite the first direction to a free end, the third portion underlying said one engagement member and the spacing member, the third portion having nailing teeth embedded in said one engagement member and the spacing member, the first, second and third portions being formed of a single piece of material, wherein the second portion defines a first plane and the third portion defines a second plane, the first plane being spaced apart from and substantially parallel to the second plane, the free end of the third portion lying in the second plane and the free end of the second portion lying in the first plane.

2. A bracing panel as set forth in claim 1 comprising at least two spacing members, each extending between and connecting the engagement members, one of the hangers being located at a junction of each engagement member and each spacing member, the nailing teeth of the hanger being embedded in the engagement member and spacing member.

3. A bracing panel as set forth in claim 2 further comprising a diagonal member extending at an angle between the engagement members and between the spacing members, one of the hanger members being located at a junction of each engagement member, spacing member and diagonal member, the nailing teeth of the hanger being embedded in the engagement member, spacing member and diagonal member at the junction.

4. A bracing panel as set forth in claim 2 wherein the first portion of each hanger is in face-to-face engagement with said one engagement member.

* * * * *